(12) United States Patent
Bains et al.

(10) Patent No.: US 8,130,576 B2
(45) Date of Patent: Mar. 6, 2012

(54) MEMORY THROUGHPUT INCREASE VIA FINE GRANULARITY OF PRECHARGE MANAGEMENT

(75) Inventors: Kuljit S. Bains, Olympia, WA (US); John B. Halbert, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 458 days.

(21) Appl. No.: 12/165,214

(22) Filed: Jun. 30, 2008

(65) Prior Publication Data

US 2009/0327660 A1    Dec. 31, 2009

(51) Int. Cl.
*G11C 7/00*    (2006.01)
(52) U.S. Cl. .................. 365/203; 365/149; 365/185.08; 365/230.03
(58) Field of Classification Search .................. 365/149, 365/185.08, 203, 230.03
See application file for complete search history.

(56) References Cited

U.S. PATENT DOCUMENTS

| 6,181,619 | B1 | 1/2001 | Bogin et al. |
| 2003/0217223 | A1 | 11/2003 | Nino et al. |
| 2004/0107324 | A1* | 6/2004 | Nystuen ........................ 711/158 |
| 2005/0132131 | A1 | 6/2005 | David |
| 2006/0239097 | A1* | 10/2006 | Nakai et al. ................... 365/222 |
| 2007/0070670 | A1 | 3/2007 | Ha et al. |
| 2009/0219051 | A1* | 9/2009 | Zhang et al. ..................... 326/38 |

OTHER PUBLICATIONS

International Search Report and Written Opinion received for PCT Application No. PCT/US2009/048589, mailed on Jan. 29, 2010, 6 pages.

* cited by examiner

*Primary Examiner* — Hoai V Ho
(74) *Attorney, Agent, or Firm* — Caven & Aghevli LLC

(57) ABSTRACT

Methods and apparatus to improve throughput in memory devices are described. In one embodiment, memory throughput is increased via fine granularity of precharge management. In an embodiment, three separate precharge timings may be used, e.g., optimized per memory bank, per memory bank group, and/or per a memory device. Other embodiments are also disclosed and claimed.

24 Claims, 6 Drawing Sheets

MEMORY THROUGHPUT INCREASE VIA FINE GRANULARITY OF PRECHARGE MANAGEMENT

FIELD

The present disclosure generally relates to the field of electronics. More particularly, an embodiment of the invention relates to increasing memory throughput via fine granularity of precharge management.

BACKGROUND

Computing systems generally rely on memory devices to store information. Such memory devices may be divided into two general types. First, volatile memory devices which require power to maintain correctness of the stored information. Second, non-volatile memory devices which maintain the stored information even after power is cut off.

One common type of volatile memory device is Dynamic Random Access Memory (DRAM). DRAM devices generally provide significantly improved performance over mechanical storage devices (such as hard disks), while providing lower cost than Static Random Access Memory (SRAM) devices.

DRAMs generally store each bit of data in a separate capacitor within an integrated circuit. Since capacitors leak charge, the information eventually fades unless the capacitor charge is refreshed periodically. Because of this refresh requirement and other design considerations, DRAMs designers impose various timing constraints on operations within a DRAM to maintain correctness. One such constraint is a precharge requirement. In particular, when access is requested to a different row (also referred to as a Bit Line (BL)) in a DRAM, the current row has to be first deactivated by issuing a "precharge" command. The precharge command will cause the sense amplifiers to switch off and the bit lines to be precharged to matching voltages that are intermediate between high and low logic levels. After a certain row precharge time period delay (also referred to as tRP), an "activate" command may be issued to activate the next row to be accessed.

Current DRAMs, however, allow no access concurrency to different banks in the DRAM after a precharge command is issued. In particular, a single timing value is used to cover precharge operation for the entire DRAM device. And, an "activate" command to open a row of memory in the DRAM device may only be issued after a delay of tRP from any precharge command.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

In some embodiments, memory throughput is increased via fine granularity of precharge management. In an embodiment, three separate precharge timings may be used, e.g., optimized per memory bank, per memory bank group, and/or per a memory device. Other levels of granularity may also be used (e.g., per bank memory cell type, per bank status, etc.). Some embodiments may be utilized in memory devices, such as the memory devices discussed with reference to FIGS. 1-6.

Figure 1:
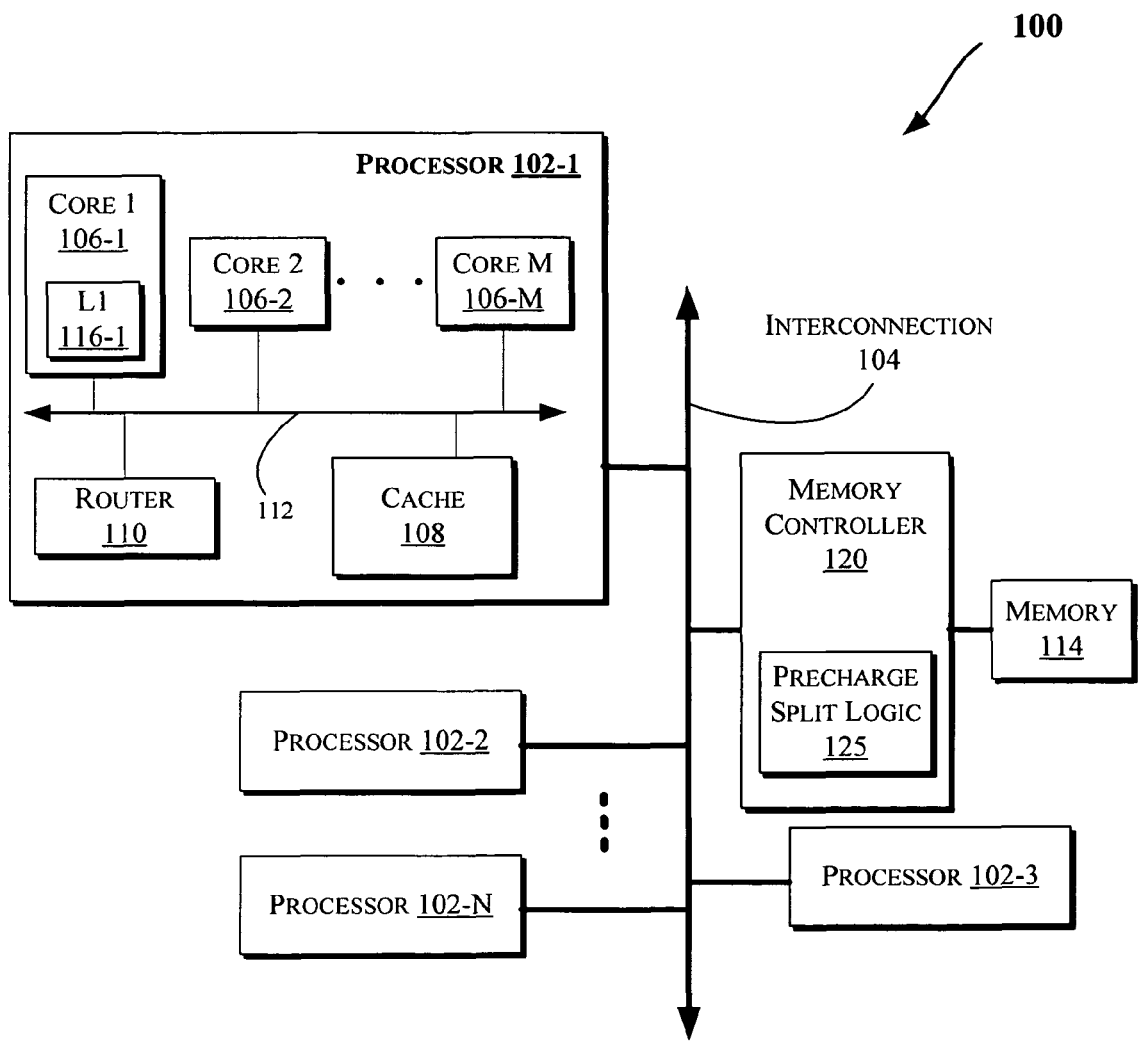
FIGS. 1, 5, and 6 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), memory controllers (such as those discussed with reference to FIGS. 5 and 6), or other components.

In one embodiment, the router 110 may be used to communicate between various components of the processor 102-1 and/or system 100. Moreover, the processor 102-1 may include more than one router 110. Furthermore, the multitude of routers (110) may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102. As shown in FIG. 1, the memory 114 may be in communication with the processors 102 via the interconnection 104. In an embodiment, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 1, memory 114 may be coupled to other components of system 100 through a memory controller 120. Even though the memory controller 120 is shown to be coupled between the interconnection 102 and the memory 114, the memory controller 120 may be located elsewhere in system 100. For example, memory controller 120 may be provided within one of the processors 102 in some embodiments. Also, in some embodiments, system 100 may include logic (e.g., precharge split logic 125 or other logic such as cores 106) to determine whether a precharge command is to be split into a plurality of precharge commands, for example, based on power management considerations as will be further discussed herein, e.g., with reference to FIG. 4.

Figure 2:
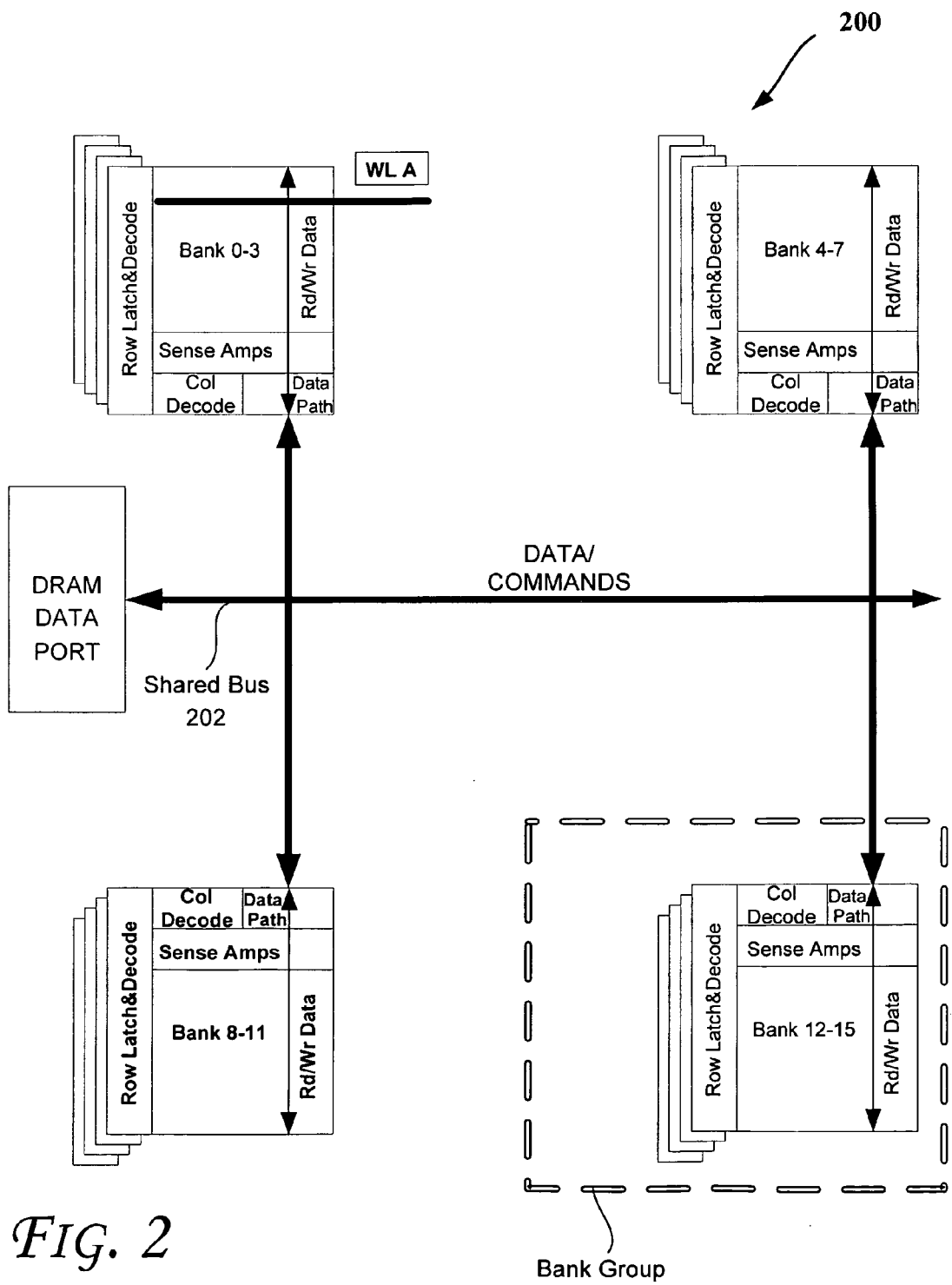
FIG. 2 illustrates a block diagram of a DRAM, which may be utilized to implement various embodiments.

FIG. 2 illustrates a block diagram of a DRAM 200, which may be utilized to implement various embodiments. In an embodiment, the memory 114 of FIG. 1 may include the DRAM 200. The DRAM 200 may include a plurality of memory banks (e.g., 16 banks are shown). The memory banks may have differing types of memory cells in some embodiments (e.g., where one type may be faster than others or may consume more or less power compared with other memory cell types). Moreover, various types of DRAM may be utilized for the memory banks shown in FIG. 2, including for example, Graphics DRAM, Fast DRAM, Low Power DRAM, etc. Also, each bank may have a different status, e.g., active or inactive (in sleep mode to conserve power when not in use, for example).

As shown in FIG. 2, the memory banks may be grouped into bank groups (e.g., four bank groups are shown). In the embodiment shown in FIG. 2, each bank group consists of four banks (e.g., banks 0-3, 4-7, 8-11, and 12-15). There may be a single shared read and write bus 202 in the core of the DRAM that is routed to all the bank groups. The bus 202 may communicate data and commands (such as precharge commands as discussed herein with respect to FIGS. 1 and 3-6 to the various banks of the DRAM 200). As shown in FIG. 2, each memory bank may include a data path (e.g., for read/write data), a row latch and decode logic (e.g., to buffer and decode row related commands corresponding to rows such as the illustrated Word Line (WL) A), sense amplifiers (e.g., each including a pair of cross-connected inverters between the bit lines to balance stored charges), and a column decode logic (e.g., to decode column related commands).

Figure 3:
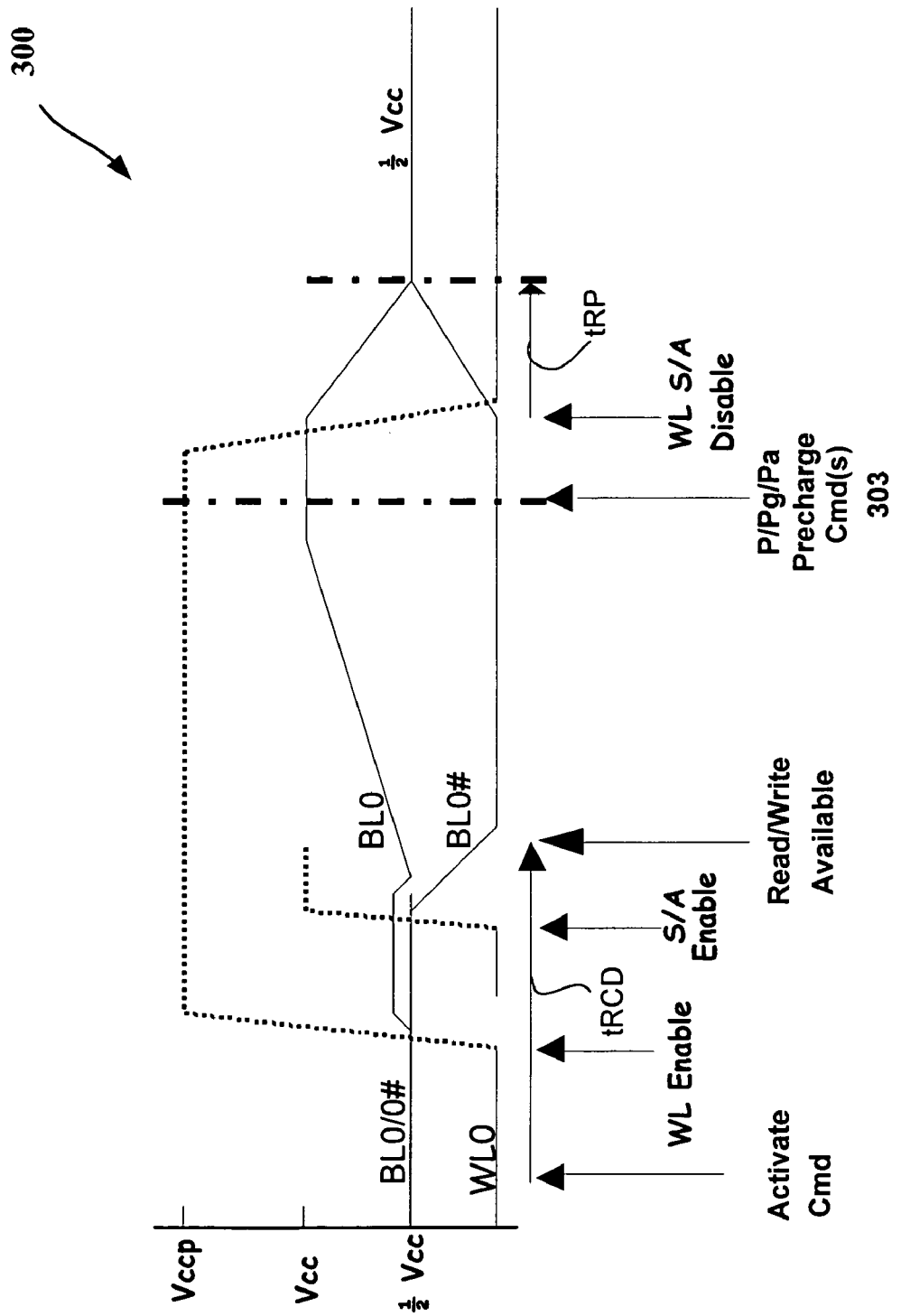
FIG. 3 shows a DRAM access waveform in accordance with some embodiments.

FIG. 3 shows a DRAM access waveform 300 in accordance with some embodiments. In particular, FIG. 3 shows when a WL and Sense Amplifier (SA) are enabled and disabled relative to commands on the external bus (e.g., bus 202 of FIG. 2). In this case, "1" is read from BL0. BL0# may be used as a reference input for the SA. The SAs are disabled as a result of precharge commands 303 (and the contents written back to the core of the DRAM device). Further details regarding the precharge commands 303 will be discussed herein with reference to FIG. 4. Bit Lines are restored to ½ Vcc level. The memory controller has to wait for tRP (which stands for row precharge time period delay). tRP generally refers to a timing delay (e.g., expressed in the number of clock cycles in some situations) required before an "activate" command may be issued to activate the next row to be accessed. Further, in FIG. 3, tRCD refers to the time (or number of clock cycles) required to elapse between defining the row and column of a given memory block and the actual read or write operation to that location.

Figure 4:
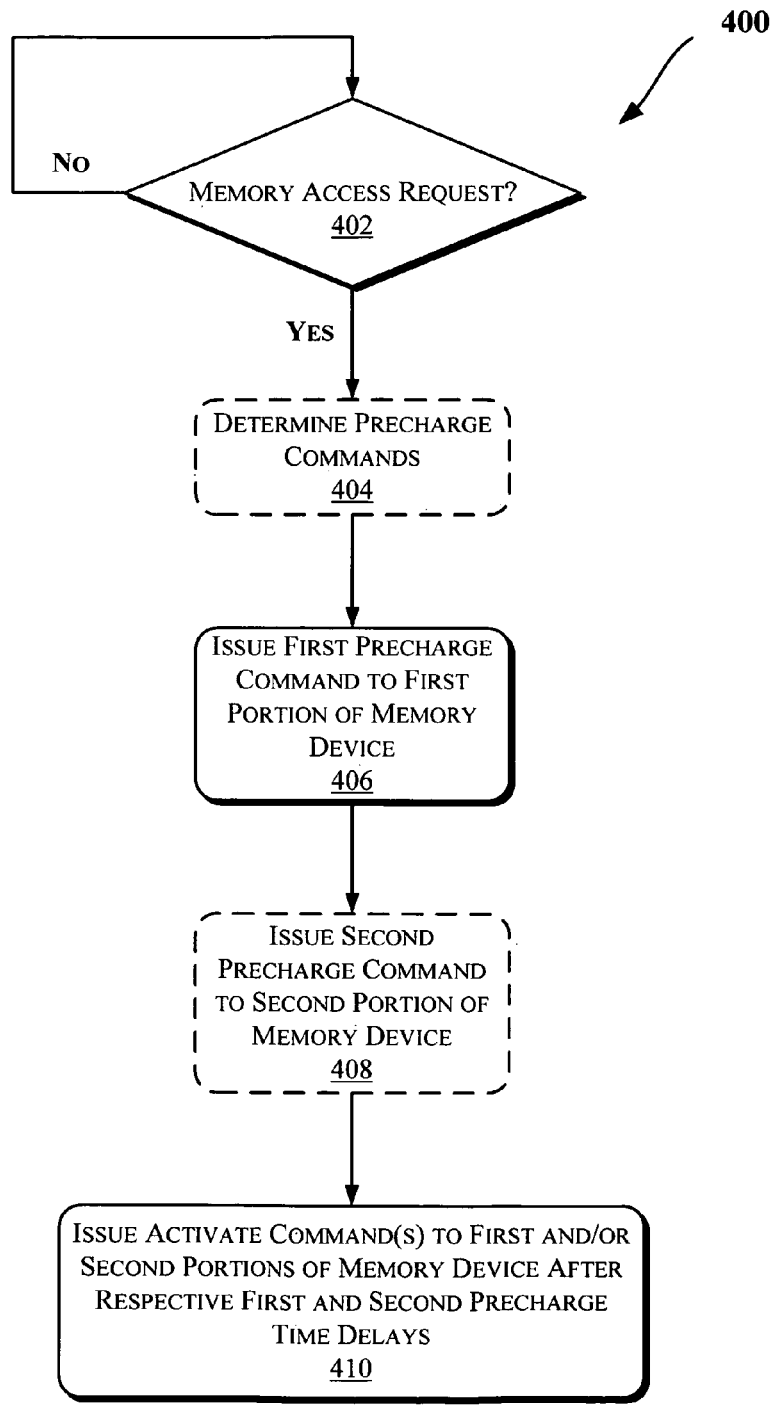
FIG. 4 illustrates a flow diagram of a method, in accordance with an embodiment of the invention.

FIG. 4 illustrates a flow diagram of an embodiment of a method 400 to issue precharge command(s) to a portion of a memory device, in accordance with an embodiment of the invention. In an embodiment, various components discussed with reference to FIGS. 1-3 and 5-6 may be utilized to perform one or more of the operations discussed with reference to FIG. 4. For example, the method 400 may be used to issue one or more precharge commands to a memory device, such as the DRAM of FIG. 2 or memory 114 of FIG. 1.

Figure 5:
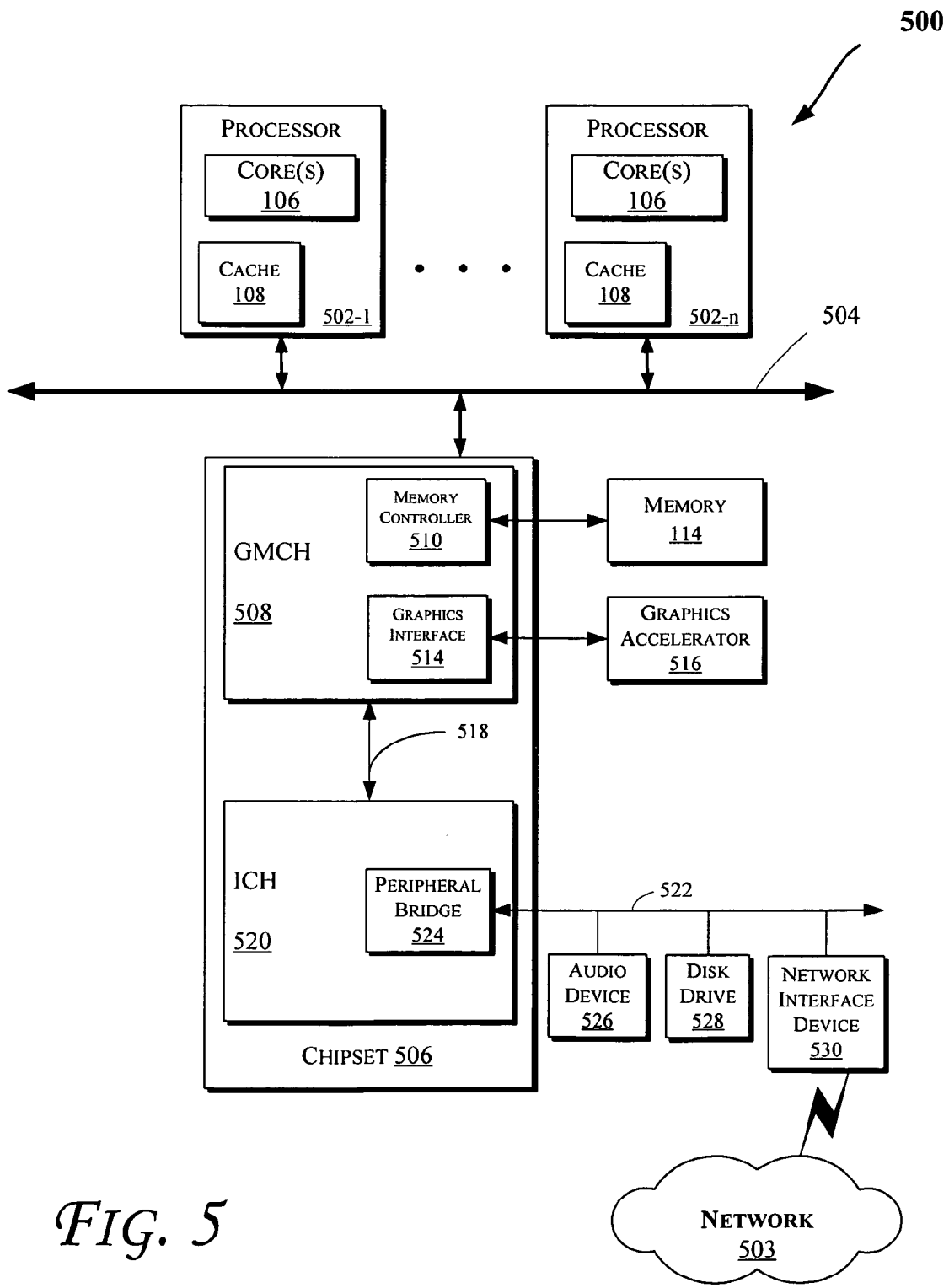
Figure 6:
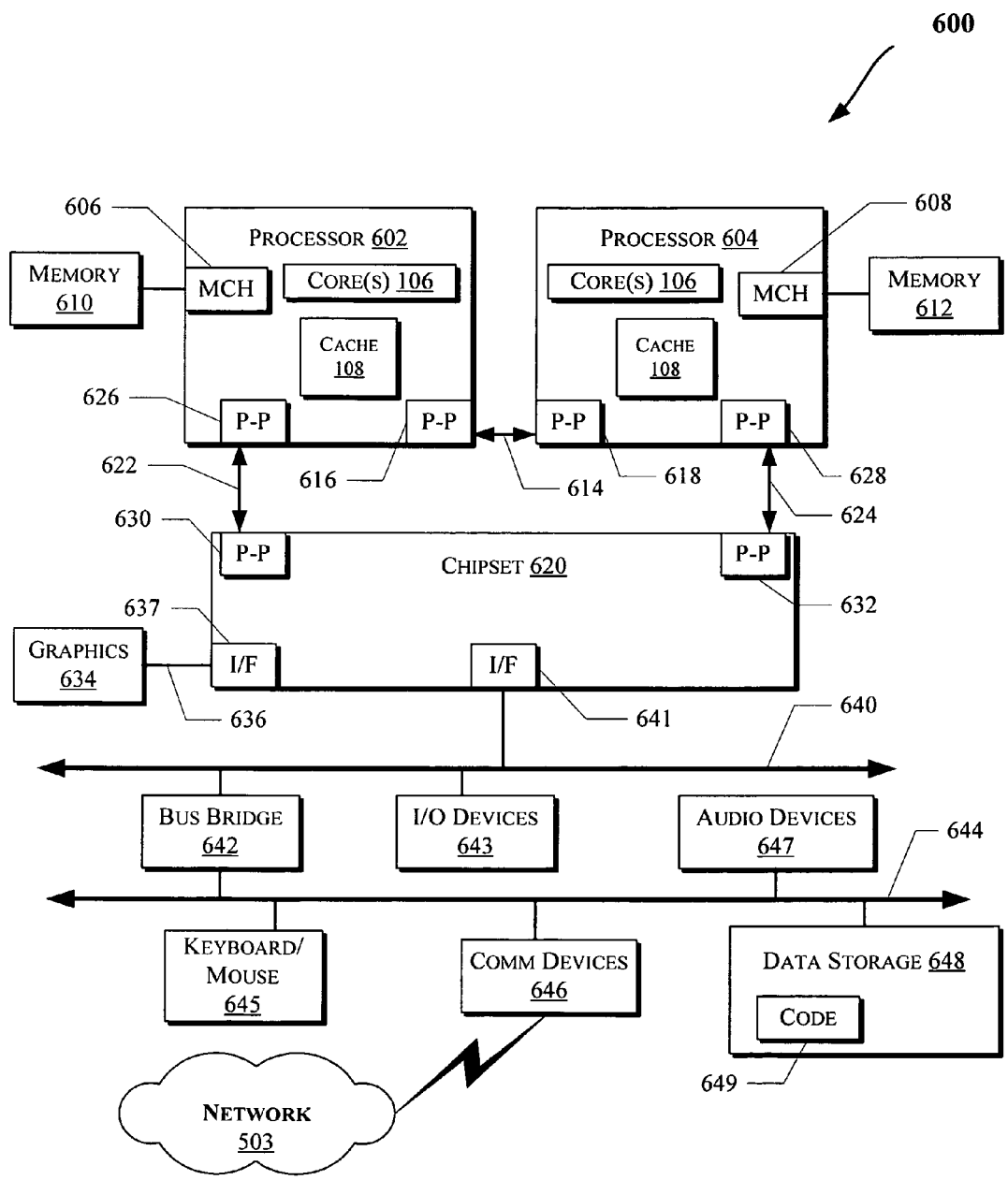

Referring to FIGS. 1-4, at an operation 402, it may be determined (e.g., by a memory controller such as those discussed herein) whether a memory access request (e.g., from one of the components of FIG. 1, 5, or 6, such as processors (e.g., 102, 502, or 602) or network/communication devices 530 or 646) is received.

At an optional operation 404, it may be determined what type or how many precharge commands may be issued to service the received memory access request. For example, in an embodiment, logic (e.g., precharge split logic 125 or other logic such as cores 106) may determine whether more than one precharge command is to be issued to service the received memory access request. For example, operation 404 may determine the number of precharge commands based on power management considerations (e.g., how many memory banks may be precharged at the same time given a power source). In an embodiment, when utilizing a battery pack in a mobile computing device to power the system (and depending on the charge level of the battery pack in one embodiment), operation 404 may cause generation of more than one precharge command which may be staggered in time to ensure that a power consumption level threshold value is not exceeded.

In some embodiments, three separate precharge timings may be used to improve the throughput of the DRAM devices:
(1) Precharge timing to a given bank is defined as tRP and the corresponding precharge command is defined as P. Hence, the P command precharges a specified bank.
(2) Precharge timing to a given bank group is defined as tRP_g and the corresponding precharge command is defined as Pg. Hence, the Pg command precharges a specific bank group.
(3) Precharge timing to precharge all banks is defined as tRP_a and the corresponding precharge command is defined as Pa.

In some embodiments, tRP_g timing parameter is expected to have a larger timing value than tRP. Similarly tRP_a is expected to be larger than tRP_g. DRAM in certain implementations may stagger the precharge operation to reduce instantaneous current draw (or power consumption). Also, some implementations may have limitations of issuing the precharge to all banks simultaneously thus resulting in larger value for tRP_a.

Furthermore, if a P command is issued to a specific bank, then an activate may be issued to any other bank in the DRAM including the banks in the same bank group without waiting for tRP period to expire. A read or write command may also be issued during the tRP period assuming the page is already open. Additionally, if a Pg command is issued to a specific bank group, then an activate may be issued to any of the banks in a different bank groups without waiting for tRP_g period to expire. In some embodiments, by providing three different precharge options, the memory controller has more flexibility in managing the DRAM resources. This also allows a more flexible approach for managing refresh if refresh per bank group is implemented in the memory device, e.g., since refresh operation to a portion of the memory device may be concurrently performed as precharge to other portion(s). Moreover, a refresh operation may involve issuance of an "Activate" and a "Precharge" command or operation. If precharge timings are optimized, then the refreshes implemented per bank (or bank group) may have similar improvements in timings and concurrency.

Referring to FIGS. 1-4, at an operation 406, a first precharge command may be issued (e.g., by a memory controller such as those discussed herein) to a first portion of a memory device (such as one or more banks of DRAM 200 of FIG. 2). At an optional operation 408, a second precharge command may be issued (e.g., by a memory controller such as those discussed herein) to a second portion of a memory device (such as one or more remaining banks of DRAM 200 of FIG. 2).

At an operation 410, an activate command may be issued (e.g., by a memory controller such as those discussed herein) to the first portion of the memory device, e.g., after a first row precharge time delay. In an embodiment, operation 410 may also issue an activate command to the second portion of the memory device after a second row precharge time delay different from the first time delay such as discussed above with respect to the different types of precharge timings.

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

In an embodiment, one or more of the processors 502 may be the same or similar to the processors 102 of FIG. 1. For example, one or more of the processors 502 may include one or more of the cores 106 and/or cache 108. Also, the operations discussed with reference to FIGS. 1-5 may be performed by one or more components of the system 500.

A chipset 506 may also communicate with the interconnection network 504. The chipset 506 may include a graphics and memory control hub (GMCH) 508. The GMCH 508 may include a memory controller 510 (which may be the same or similar to the memory controller 120 of FIG. 1 in an embodiment) that communicates with the memory 114. The memory 114 may store data, including sequences of instructions that are executed by the CPU 502, or any other device included in the computing system 500. In one embodiment of the invention, the memory 114 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The GMCH 508 may also include a graphics interface 514 that communicates with a graphics accelerator 516. In one embodiment of the invention, the graphics interface 514 may communicate with the graphics accelerator 516 via an accelerated graphics port (AGP). In an embodiment of the invention, a display (such as a flat panel display) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the GMCH 508 in some embodiments of the invention. In addition, the processor 502 and the GMCH 508 may be combined to form a single chip. Furthermore, the graphics accelerator 516 may be included within the GMCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 114 of FIGS. 1 and/or 5. Also, MCH 606 and 608 may include the memory controller 120 and/or logic 125 of FIG. 1 in some embodiments.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

As shown in FIG. 6, one or more of the cores 106 and/or cache 108 of FIG. 1 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may have one or more devices that communicate with it, such as a bus bridge 642 and I/O devices 643. Via a bus 644, the bus bridge 643 may communicate with other devices such as a keyboard/mouse 645, communication devices 646 (such as modems, network interface devices, or other communication devices that may communicate with the computer network 503), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6.

Additionally, such computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   a memory device; and
   a memory controller to:
      issue a first precharge command to a first portion of the memory device; and
      issue an activate command to the first portion of the memory device after a first row precharge time delay, wherein the first portion of the memory device comprises a first set of one or more memory cells and a second set of one or more memory cells, wherein the memory controller is to issue a separate precharge commands to each of the first set and the second set of the one or more memory cells in response to a determination that issuance of a single precharge command to the first portion may cause consumption of power over a threshold value.

2. The apparatus of claim 1, wherein the memory controller is to:
   issue a second precharge command to a second portion of the memory device; and
   issue an activate command to the second portion of the memory device after a second row precharge time delay different from the first time delay.

3. The apparatus of claim 1, wherein the memory device comprises a Dynamic Random Access Memory (DRAM).

4. The apparatus of claim 3, wherein the first portion of the memory device comprises one or more banks of the DRAM.

5. The apparatus of claim 1, wherein:
   the memory comprises a Dynamic Random Access Memory (DRAM);
   the memory controller is to issue a second precharge command to a second portion of the memory device; and
   each of the first portion and the second portion of the memory device comprises one or more banks of the DRAM.

6. The apparatus of claim 1, wherein:
   the memory controller is to issue a second precharge command to a second portion of the memory device;
   the first portion of the memory device is to comprise a first type of one or more memory cells; and
   the second portion of the memory device is to comprise a second type of one or more memory cells different from the first type.

7. The apparatus of claim 6, wherein the first type of the one or more memory cells have a lower power consumption level than the second type of the one or more memory cells.

8. The apparatus of claim 1, wherein:
   the memory controller is to issue a second precharge command to a second portion of the memory device;
   the first portion of the memory device is to comprise one or more memory cells having a first status; and
   the second portion of the memory device is to comprise one or more memory cells having a second status different from the first status.

9. The apparatus of claim 8, wherein the first status is active and the second status is inactive.

10. The apparatus of claim 1, further comprising one or more processor cores to access the memory device.

11. The apparatus of claim 10, wherein at least one of the one or more processor cores and the memory controller are on a same die.

12. A method comprising:
   issuing a first precharge command to a first portion of a memory device, wherein the memory device comprises a plurality of memory cells and the first portion of the memory device comprises less than all of the plurality of memory cells;
   issuing an activate command to the first portion of the memory device after a first row precharge time delay;
   determining whether issuance of a single precharge command to the first portion of the memory device may cause consumption of power over a threshold value, wherein the first portion of the memory device comprises a first set of one or more memory cells and a second set of one or more memory cells; and
   issuing a separate precharge command to each of the first set and the second set of the one or more memory cells in response to a determination that issuance of a single precharge command to the first portion of the memory device may cause consumption of power over the threshold value.

13. The method of claim 12, further comprising:
issuing a second precharge command to a second portion of the memory device; and
issuing an activate command to the second portion of the memory device after a second row precharge time delay different from the first time delay.

14. The method of claim 12, wherein the memory comprises a Dynamic Random Access Memory (DRAM).

15. The method of claim 14, wherein the first portion of the memory device comprises one or more banks of the DRAM.

16. The method of claim 12, further comprising issuing a second precharge command to a second portion of the memory device, wherein the first portion of the memory device is to comprise a first type of one or more memory cells and the second portion of the memory device is to comprise a second type of one or more memory cells different from the first type.

17. The method of claim 12, further comprising issuing a second precharge command to a second portion of the memory device, wherein the first portion of the memory device is to comprise one or more memory cells having a first status and the second portion of the memory device is to comprise one or more memory cells having a second status different from the first status.

18. The method of claim 12, further comprising generating the first precharge command in response to a request for read or write access to the memory device.

19. A system comprising:
a memory device having a plurality of memory cells;
a processor to access the memory device; and
a memory controller to:
issue a first precharge command to a first portion of the memory device; and
issue an activate command to the first portion of the memory device after a first row precharge time delay, wherein the first portion of the memory device comprises a first set of one or more memory cells and a second set of one or more memory cells, wherein the memory controller is to issue a separate precharge commands to each of the first set and the second set of the one or more memory cells in response to a determination that issuance of a single precharge command to the first portion may cause consumption of power over a threshold value.

20. The system of claim 19, wherein the memory device comprises a Dynamic Random Access Memory (DRAM).

21. The system of claim 20, wherein the first portion of the memory device comprises one or more banks of the DRAM.

22. The system of claim 19, wherein the memory controller is to:
issue a second precharge command to a second portion of the memory device; and
issue an activate command to the second portion of the memory device after a second row precharge time delay different from the first time delay.

23. The system of claim 19, wherein the processor comprises one or more processor cores to access the memory device.

24. The system of claim 19, further comprising an audio device.

* * * * *